United States Patent [19]

Shimura

[11] Patent Number: 5,089,058

[45] Date of Patent: Feb. 18, 1992

[54] METHOD AND APPARATUS FOR HIGH FREQUENCY HEAT-TREATMENT OF LONG CONTINUOUS METAL BLANKS

[75] Inventor: Fumihiko Shimura, Numazu, Japan

[73] Assignee: Usui Kokusai Sangyo Kaisha Ltd., Shizuoka, Japan

[21] Appl. No.: 346,671

[22] Filed: May 3, 1989

[30] Foreign Application Priority Data

May 13, 1988 [JP] Japan ................... 63-116172

[51] Int. Cl.$^5$ .................................................. C21D 1/74
[52] U.S. Cl. ........................... 148/16; 148/16.7; 148/150; 148/153; 148/154; 148/156; 266/104; 266/110
[58] Field of Search ............... 148/153, 150, 154, 156, 148/16, 16.7; 266/104, 110

[56] References Cited

U.S. PATENT DOCUMENTS 4,515,645 5/1985 Bohm .................................. 148/16

Primary Examiner—R. Dean
Attorney, Agent, or Firm—Armstrong, Nikaido, Marmelstein, Kubovcik, & Murray

[57] ABSTRACT

The invention relates to a high frequency heat-treatment of long continuous metal blanks wherein the long continuous metal blanks are fed in their lengthwise direction by a pushing rod which is insensible to the high frequency to pass through a high frequency heating furnace and to be introduced into a cooling chamber in which a transferring means consisting of a plurality of, for example, chain conveyors is provided to transfer the long continuous metal blanks laterally, i.e. in the direction perpendicular to their lengthwise direction for sufficiently cooling them. According to the invention the apparatus can be installed in a relatively small space and the long continuous metal blanks can be successively subjected to the heat-treatment efficiently.

18 Claims, 1 Drawing Sheet

U.S. Patent
Feb. 18, 1992
5,089,058
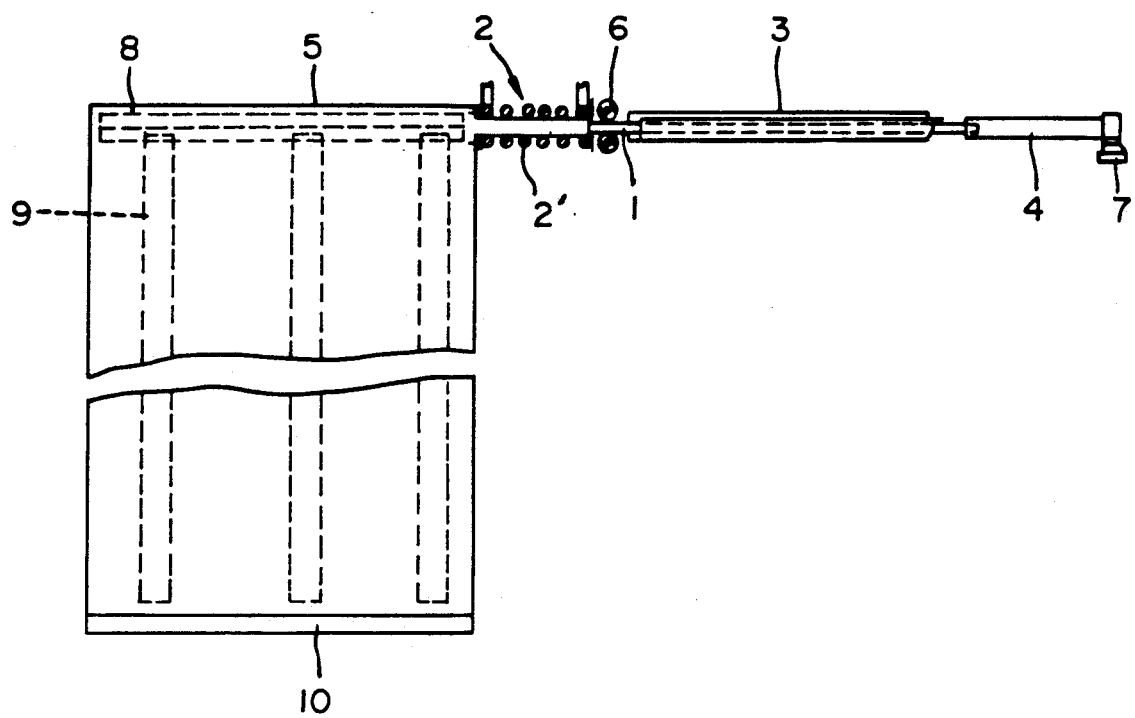
Fig. 1
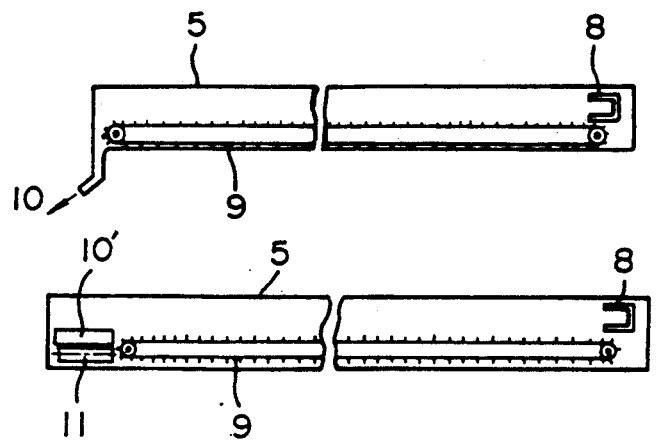
Fig. 2
Fig. 3

METHOD AND APPARATUS FOR HIGH FREQUENCY HEAT-TREATMENT OF LONG CONTINUOUS METAL BLANKS

BACKGROUND OF THE INVENTION

1. Field of the Invention

The present invention relates to a method and apparatus for high frequency heat-treatment of long continuous metal blanks, particularly, steel pipes of a fixed length to be used for feeding various kinds of fluids or for mechanical structures.

2. Description of the Prior Art

The conventional high frequency heat-treatments of long continuous metal blanks, each having a fixed length, such as metal pipes to be used for brake oil piping for automobiles, piping for feeding liquid or gaseous fuel or other liquids or for mechanical structures, have been carried out by feeding the long continuous metal blanks in their lengthwise direction to pass them through a high frequency heating means and subsequently feed them into a long cooling chamber arranged in alignment with the heating means. In order to feed continuously the long continuous blanks to the conventional heat-treatments a plurality of long continuous metal blanks must be jointed end-to-end to form a single tremendously long metal blank. Therefore, in the conventional heat-treatments it has indispensably been required to provide a means for making the end-to-end joints of the long continuous metal blanks, a means for disconnecting or cutting the end-to-end joints and a means for removing the disconnected or cut end-to-end joints.

However, in view of the use of the high frequency heating means which is capable of effecting a converged heating with a high density and the heating to save the manufacturing cost of the metal pipes the conventional heat-treatments have been required to feed the metal pipes of fixed length to be heated to the high frequency heating means at a high speed and, prior to subjecting to the high frequency heating means, to carry out the end-to-end jointing step of the metal pipes by heating them and using a jointing means at a speed synchronized with the metal pipe feeding speed.

Furthermore, according to the conventional heat-treatments it is required to provide a very long cooling chamber for cooling the tremendously long metal pipe which was passed through the high frequency heating means which effects a rapid heating. (Usually, the cooling chamber must be formed about 3 to 8 times longer than the long length of metal pipe, though the length of the cooling chamber is varied with the diameter or wall thickness of the metal pipes, the magnitude of high frequency energy or the pipe feeding speed.) If the length of the cooling chamber is shorter than that as above defined, the metal pipe will be insufficiently cooled so that the surface thereof may be oxidized after discharged from the cooling chamber. The provision of the long cooling chamber makes inevitably the installation of the apparatus so large as to occupy a space of more than several ten meters for feeding the tremendously long continuous metal blanks to be heated. This occupation of the space will be further enlarged because of the addition of the end-to-end jointing means, disconnecting or cutting means and removing means to the front of the heating means or the back of the cooling means in series. Such enlarged occupation of the space issues often a problem in the lay-out of the plant.

In addition, according to the conventional heat treatments the tremendously long metal pipe which was discharged from the cooling chamber must be immediately subjected to the disconnection or cutting of the joint portions thereof o removal of the joint portions in synchronization with the pipe feeding speed so that the production efficiency may be reduced and the cutting or removal of the joint portions may be resulted in a production of scraps, thereby deteriorating the yield of production and causing the production cost to be expensive.

SUMMARY OF THE INVENTION

The present invention is to provide novel method and apparatus for high frequency heat-treatment of long continuous metal blanks, which eliminate such the defects as provided by the conventional arts and can be operated efficiently in a small space, thereby reducing the production costs.

The present invention is directed to an improvement in the method and apparatus for heat treatment of the long continuous metal blanks wherein the long continuous metal blanks are heated rapidly by a high frequency heating in an atmosphere of inert gas, non-oxidizing gas or reducing gas, the improvement of which comprises, firstly, the steps of pushing a long continuous metal blank laid on a guide means by a pushing rod which is insensible to the high frequency into a cooling chamber connected in series with a heating furnace and cooling the heated long continuous metal blank in the cooling chamber while transferring it in the lateral direction and, secondly, a cooling chamber having an intake for the long continuous metal blank, the intake of which being arranged in alignment with the center of a heating furnace and a guide means, a pushing rod for pushing the long continuous metal blank laid on the guide means into the cooling chamber passing through the heating furnace at a predetermined speed, the pushing rod of which being composed of non-magnetic material and insensible to the high frequency, and means for transferring the long continuous metal blank in the lateral direction in the cooling chamber.

According to the present invention the long continuous metal blanks can be fed wholly from the heating furnace to the cooling chamber at a constant speed without need of jointing them with one another and the long continuous metal blanks which were heated by the heating furnace are fed at a high possible speed into the cooling chamber wherein they are transferred in the lateral direction substantially perpendicular to the feeding direction, whereby the cooling of the long continuous metal blanks can be effected for a relatively long time in a small space.

DESCRIPTION OF THE DRAWINGS

FIG. 1 is an explanatory view showing an embodiment of a high frequency heat treatment of the present invention;

FIG. 2 is a sectional view showing an embodiment of a cooling chamber; and

FIG. 3 is a sectional view showing an another embodiment of the cooling chamber.

DETAILED DESCRIPTION OF PREFERRED EMBODIMENT

Now the present invention will be described in detail with reference to the accompanied FIGS. 1 and 2. A long continuous metal blank such as a metal pipe 1 having a fixed length is laid on a guide means 3 provided in the front of a heating furnace 2 mad of a glass tube wound thereon with a work coil 2 for high frequency heat-treatment. The rear end of the metal pipe 1 is caught by an end of a pushing rod 4 which is insensible to the high frequency. The pushing rod 4 pushes the metal pipe 1 wholly into a cooling chamber 5 passing through the heating furnace 2 at a constant speed with the aid of a proper means, for example, rollers 6. In the present invention, the pushing rod 4 may be of a sufficient length to stretch its fore end into the cooling chamber. 7 denotes a supporting member for the pushing rod 4. In the heating furnace 2 the metal pipe 1 is subjected to the high frequency heating to be rapidly heated by the work coil 2' in the atmosphere of inert gas, non-oxidizing gas or reducing gas. The metal pipe 1 is then fed into a tube guide 8 provided in the cooling chamber 5 in which a cooled reducing gas is circulated. The cooling chamber 5 is provided therein with a feeding means 9 consisting of a plurality of chain conveyers arranged at proper intervals, the chain conveyers of which being moved in the lateral direction perpendicular to the lengthwise direction of the metal pipe 1, i.e. the metal pipe pushing direction. The metal pipe 1 fed in the tube guide 8 is transferred to the feeding means 9 to convey the metal pipe 1 laterally while cooling it and discharged from an outlet 10 which is bent downwardly to be in a substantially L-shape and provided at a side end of the cooling chamber 5.

The outlet of the cooling chamber may be formed as shown in FIG. 3 wherein a conveyer means consisting of a plurality of rollers 11 rotating in the direction perpendicular to the metal pipe feeding direction by the feeding means 9 is provided at a side of the feeding mechanism 9 and an outlet 10' is provided on the same side as of the heating furnace 2 or opposite side thereto.

The high frequency heat treating apparatus of the present invention can further be applied to a continuous annealing step in the pipe manufacturing system.

According to the present invention, as above described, the long continuous metal blank such as metal pipe or metal rod is pushed in its lengthwise direction by the pushing rod composd of non-magnetic material which is insensible to the high frequency to be introduced in the cooling chamber passing through the heating furnace so that the long continuous blank can be heated equally throughout its length in the heating furnace, thereby obtaining a homogenized product of good quality. Besides, the cooling chamber can be formed in a small space as compared with the conventional installation and the apparatus of the present invention requires no provision of a jointing means of the long continuous metal blanks and a disconnecting or cutting means thereof. Therefore, the apparatus of the present invention contributes to expand a range of the selection of a site for the factory, i.e. the installation of the apparatus in a small space as compared with the conventional apparatus and to increase the production efficiency by increasing the yield. Furthermore, according to the present invention the apparatus requires no provision of means for jointing or disconnecting the long continuous metal blanks so that it can accelerate the production rate, and the long continuous metal blanks can be sufficiently cooled in the cooling chamber so that the long continuous metal blanks are not subjected to surface oxidation after cooling.

What is claimed is:

1. A method for heat-treatment of long continuous metal blanks wherein the long continuous metal blanks are rapidly heated by high frequency heating in a predetermined atmosphere and then cooled rapidly in said atmosphere, the improvement of which comprises the steps of:
   (a) pushing the long continuous metal blank laid on a guide means into a cooling chamber connected in series with a heating furnace after passing through the heating furnace at a predetermined speed by a pushing rod which is insensible to the high frequency; and
   (b) cooling said long continuous metal blank in said cooling chamber while transferring it in a direction substantially perpendicular to the pushing direction thereof.

2. The method according to the claim 1, wherein said predetermined atmosphere is an atmosphere of inert gas, non-oxidizing gas or reducing gas.

3. The method according to claim 1, wherein said pushing rod is composed of non-magnetic material.

4. The method according to claim 3, wherein said non-magnetic material is a ceramic.

5. The method according to claim 1, wherein the long continuous metal blanks are transferred in the cooling chamber by means of chain conveyers.

6. An apparatus for heat-treatment of long continuous metal blanks wherein the long continuous metal blanks are heated rapidly by a high frequency heating means in a predetermined atmosphere and then cooled rapidly in said predetermined atmosphere, the improvement comprising:
   guide means on which the long continuous metal blank is laid; a cooling chamber having an intake for said long continuous metal blank;
   high frequency heating means arranged substantially in alignment with said guide means and in series with said intake of the cooling chamber;
   means for pushing said long continuous metal blank laid on said guide means initially through said heating means and subsequently into a cooling chamber at a predetermined speed by a pushing rod insensitive to the high frequency; and
   means for transferring said long continuous metal blank laterally in said cooling chamber.

7. The apparatus according to claim 6, wherein said proper atmosphere is an atmosphere of inert gas, non-oxidizing gas or reducing gas.

8. The apparatus according to claim 6 wherein said pushing rod is composed of non-magnetic material.

9. The apparatus according to claim 8 wherein said non-magnetic material is a ceramic.

10. The apparatus according to claim 6, wherein the long continuous metal blanks are transferred in the cooling chamber by means of chain conveyers.

11. The apparatus according to claim 6, wherein said high frequency heating means is a heating furnace is composed a glass tube wound thereon with a work coil.

12. The apparatus according to claim 6, wherein said pushing means includes a roller means for feeding said long continuous metal blank wholly into said cooling chamber through said intake.

13. The apparatus according to claim 12, wherein said pushing means has a length sufficient to stretch its fore end into said cooling chamber.

14. A method for heat-treatment of long continuous metal blanks wherein the long continuous metal blanks are rapidly heated by high-frequency heating in a predetermined atmosphere and then cooled rapidly in said atmosphere, the improvement which comprises the steps of:

(a) laying the long continuous blank onto guide means, (b) pushing the long continuous metal blank via said guide means through a heating furnace at a predetermined speed thereby heating the blank;

(c) pushing the long continuous metal blank via said guide means into a cooling chamber;

(d) cooling the blank while transferring the long continuous metal blank in the cooling chamber in a direction substantially perpendicular to the pushing direction of the guide means.

15. The method according to claim 14, wherein said predetermined atmosphere is one of an inert gas, an oxidizing gas and a reducing gas.

16. The method according to claim 14, wherein said pushing rod is composed of non-magnetic material.

17. The method according to claim 16, wherein said non-magnetic material is a ceramic.

18. The method according to claim 14, wherein the long continuous metal blanks are transferred in the cooling chamber by means of chain conveyors.

* * * * *